United States Patent
Lin

(10) Patent No.: US 9,124,548 B2
(45) Date of Patent: Sep. 1, 2015

(54) METHOD FOR UPLOADING MEDIA FILE, ELECTRONIC DEVICE USING THE SAME, AND NON-TRANSITORY STORAGE MEDIUM

(71) Applicant: HTC Corporation, Taoyuan County (TW)

(72) Inventor: Yi-Shan Lin, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 272 days.

(21) Appl. No.: 13/747,426

(22) Filed: Jan. 22, 2013

(65) Prior Publication Data

US 2013/0227082 A1    Aug. 29, 2013

Related U.S. Application Data

(60) Provisional application No. 61/602,606, filed on Feb. 24, 2012.

(51) Int. Cl.
G06F 15/16      (2006.01)
H04L 29/08      (2006.01)
H04L 29/06      (2006.01)
G06F 12/00      (2006.01)

(52) U.S. Cl.
CPC .............. *H04L 67/02* (2013.01); *H04L 29/06* (2013.01); *H04L 67/06* (2013.01)

(58) Field of Classification Search
USPC .............. 709/203, 217–219, 223–229, 250
See application file for complete search history.

(56) References Cited

U.S. PATENT DOCUMENTS 8,385,950 B1 *   2/2013   Wagner et al. ............... 455/466
2011/0154404 A1 * 6/2011   Piepenbrink et al. .......... 725/53

* cited by examiner

*Primary Examiner* — Zarni Maung
(74) *Attorney, Agent, or Firm* — Jianq Chyun IP Office

(57) ABSTRACT

A method for uploading a media file to an online service, an electronic device using the same, and a non-transitory storage medium are provided. In the present method, a plurality of upload rules corresponding to an online service are obtained. A media capture application is initiated on an electronic device. A media file captured by using the media capture application is automatically uploaded to the online service in accordance with the upload rules. Accordingly, the user only has to launch the media capture application to capture the media file, then the captured media file is automatically uploaded to the specific online service without launching an application of the online service.

21 Claims, 4 Drawing Sheets

METHOD FOR UPLOADING MEDIA FILE, ELECTRONIC DEVICE USING THE SAME, AND NON-TRANSITORY STORAGE MEDIUM

CROSS-REFERENCE TO RELATED APPLICATION

This application claims the priority benefits of U.S. provisional application Ser. No. 61/602,606, filed on Feb. 24, 2012. The entirety of the above-mentioned patent application is hereby incorporated by reference herein and made a part of this specification.

BACKGROUND OF THE INVENTION

1. Field of the Invention

The present invention relates to a file uploading method. More particularly, the present invention relates to a method for automatically uploading a media file to an online service, an electronic device using the same, and a non-transitory storage medium.

2. Description of Related Art

Along with the development of technology, electronic devices have almost become one of the basic necessities of modern life. To cope with modern busy lifestyle, mobile devices equipped with numerous functions and occupying less space and easy to carry are developed. For example, mobile phones are widely used to help people to communicate with each other at anytime anywhere. Besides, the networking and camera functions of the mobile phones allow the users to view web page information, take pictures, and record video conveniently.

The camera application and the digital video (DV) camera application is the most common application comes with the mobile phones. However, if the user wants to share the pictures taken by the camera/DV camera to a certain social network, the user has to launch the related social network application and select the picture/video upload option to upload the pictures and/or the videos from the mobile phone to the social network. As described above, a lots of operation time is consumed by such file upload way.

SUMMARY OF THE INVENTION

Accordingly, the present invention is directed to a method for uploading a media file to an online service, an electronic device, and a non-transitory storage medium, by which a simple way to automatically upload the media file to the online service is provided.

The present invention is directed to a method for uploading a media file to an online service. In the present method, a plurality of upload rules corresponding to an online service are obtained. A media capture application is initiated on an electronic device. A media file captured by using the media capture application is automatically uploaded to the online service in accordance with the upload rules.

The present invention is directed to an electronic device having a media capture device, memory, one or more processors, and one or more programs. In which, the one or more programs are stored in the memory and configured to be executed by the one or more processors. The one or more programs including instructions to obtain a plurality of upload rules corresponding to an online service, initiate a media capture application and accordingly activate the media capture device, and automatically upload a media file captured by using the media capture application to the online service in accordance with the upload rules.

The present invention is directed to a non-transitory storage medium, storing a computer program for loading into an electronic device, the computer program comprising commands to obtain a plurality of upload rules corresponding to an online service, commands to initiate a media capture application on the electronic device, and commands to automatically upload a media file captured by using the media capture application to the online service in accordance with the upload rules.

In the present invention, the user only has to launch the media capture application to take a picture or record a video, then the picture or the video will be uploaded automatically to a selected online service. Accordingly, the purpose of improving the convenience of uploading the media file can be achieved.

In order to make the aforementioned and other objects, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
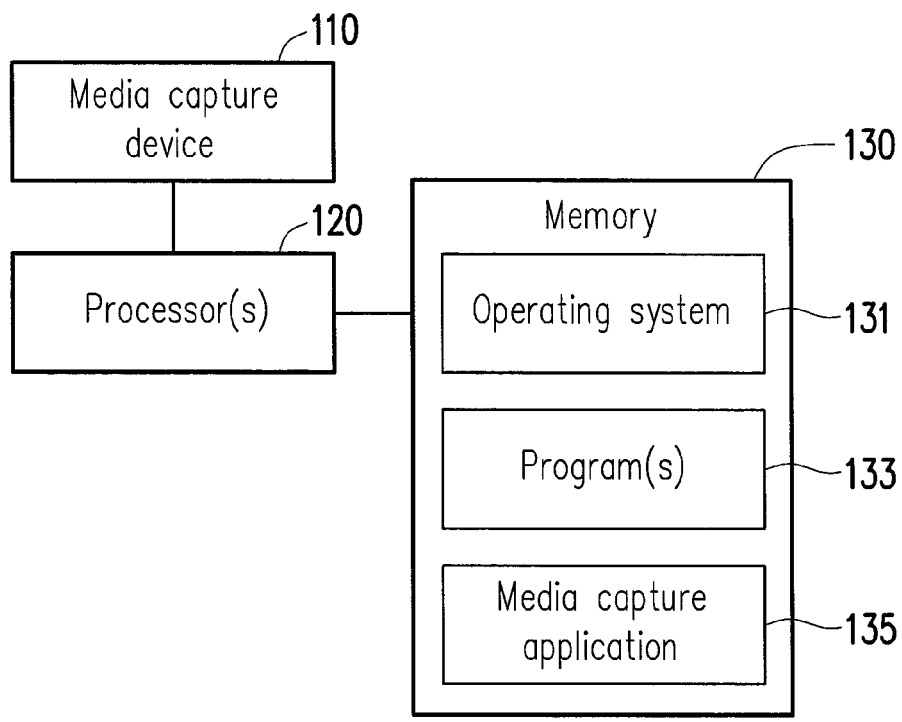
FIG. 1 is a block diagram of an electronic device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

In order to make the content of the present invention more clear, embodiments are described as follows to serve as the examples of which the present invention may be implemented accordingly.

FIG. 1 is a block diagram of an electronic device according to an embodiment of the present invention. Referring to FIG. 1, the electronic device 100 includes a media capture device 110, one or more processors 120, and a memory 130. The electronic device 100 is, for example, a mobile phone, a smart phone, a personal digital assistant (PDA), a laptop, or a tablet personal computer (PC), the present invention is not limited thereto.

The media capture device 110 is configured to generate a plurality of media files. For example, the media capture device 110 comprises one or more image sensors (e.g., the CCD sensor, or the CMOS sensor), one or more lenses, and one or more signal-processing ICs. The media capture device 110 may capture light of a scene and convert it into electrical signals, so that a still image file and/or a video file will be generated accordingly. The media capture device 110 is, for example, a digital camera, a digital video (DV) camera, a single lens reflex (SLR) camera, or other devices with image-capturing and/or video-recording capabilities, which is not limited by the present invention.

The one or more processors 120 may be central processing units (CPUs), which is configured to run various software programs and/or instruction sets stored in the memory 130 to perform different functions of the electronic device 100, and to process data after the electronic device 100 is powered on.

The memory 130 may be an internal storage unit such as a random access memory or a non-volatile memory (e.g., a flash memory, or a magnetic disk storage device). The memory 130 may also be an external storage unit such as secure digital (SD) card, a SIM card, or other storage media which can be externally connected to the electronic device 100. In the present embodiment, at least an operating system 131, one or more programs 133 and a media capture application 135 are installed in the memory 130. However, the system data and/or the user data (e.g., the media file) generated during the operation of the electronic device 100 may also stored in the memory 130.

The operating system 131 includes various software components and/or drivers and is used for managing a general operation of the electronic device 100. For example, the operating system 131 provides a user interface for users to interact with the electronic device 100, manages applications that are running on the electronic device 100, and manages files stored in the electronic device 100.

The one or more programs 133 comprise instructions to be executed by the one or more processors 120. To be specific, the one or more processors 120 run the one or more programs 133 to perform a method for uploading a media file to an online service of the present embodiment. The method for uploading the media file to the online service of the present embodiment is described later with reference of figures.

The media capture application 135 is configured to provide an interface for showing the live preview image or video to the user. To be specific, the electronic device 100 enters the media capturing mode after the media capture application 135 is launched. In the media capturing mode, the media capture device 110 is activated and the image or the video captured by the media capture device 110 will be processed and stored as the media file by the media capture application 135. Furthermore, the media capture application 135 provides a setting menu, so that the user may change a plurality of related settings through the setting menu. The related settings may include at least one of resolution, white balance, brightness, storage, and self-timer. In the present embodiment, the related settings further include a plurality of upload rules that should be followed while uploading a media file to an online service.

Moreover, the electronic device 100 further includes a screen (not shown) for displaying a user interface of the electronic device 100, the screen may be a resistive touch screen, a capacitive touch screen, an optical touch screen, or a magnetic touch screen, which is not limited by the present invention.

The electronic device 100 also includes a network module (not shown), which is configured to connect the electronic device 100 to a wireless or wired network. The wireless network is, for example, the wireless fidelity (WiFi) network, the global system for mobile communications (GSM) network, the code division multiple access (CDMA) network, the general packet radio service (GPRS) network, the $3^{rd}$-generation (3G) networks, the 4G network, or the worldwide interoperability for microwave access (WiMAX) network. The wired network may be the Internet, the local area network (LAN), or the wide local area networks (WLAN).

In the present embodiment, the electronic device 100 is able to access several online services through corresponding applications. The online service is, for example, an online album, a social networking site, or an online storage, which should however not be construed as limitations to the invention. It is assumed that an application corresponding to each accessible online service is stored in the memory 130, when the user launches the application corresponding to a certain online service and log onto the online service via the electronic device 100, the user is able to access various services and resources provided by the online service. For instance, the user may share any media file with friends on the social networking site by uploading the media file through the application of the social networking site. However, in the present embodiment, the user can upload media files to the online service without launching the corresponding application.

Figure 2:
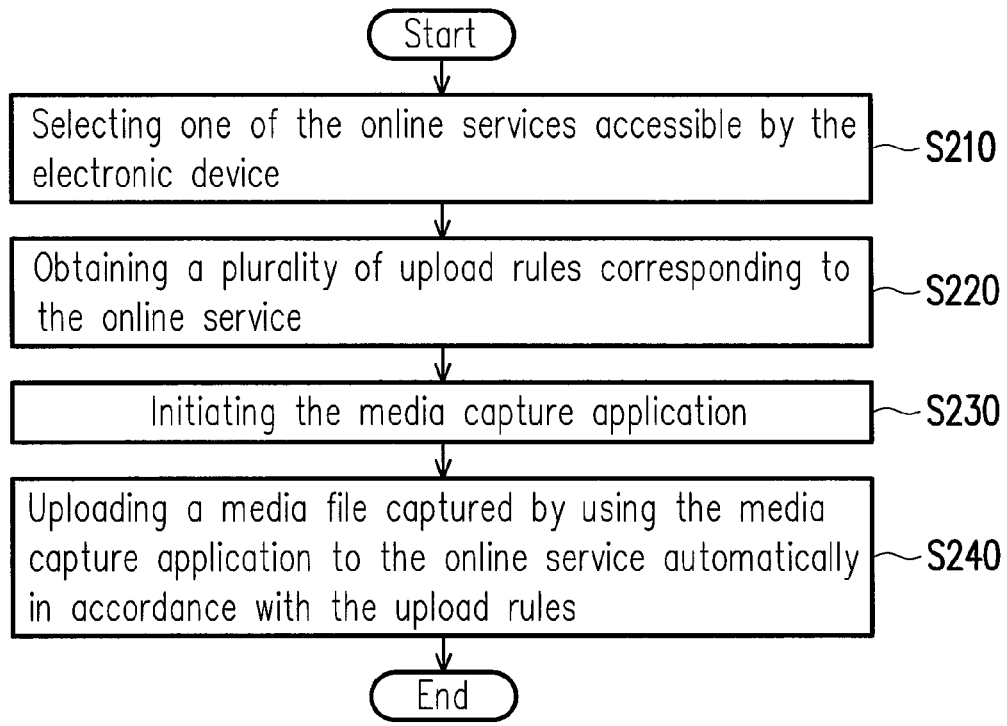
FIG. 2 is a flow chart of a method for uploading a media file to an online service according to an embodiment of the present invention.

Below, the operation of the electronic device 100 will be described in detail. FIG. 2 is a flow chart of a method for uploading a media file to an online service according to an embodiment of the present invention. Please refer to FIG. 1 and FIG. 2.

In step S210, one of the online services accessible by the electronic device 100 is selected as the upload destination, and the log-in status is verified after the selection. To be specific, whether the electronic device 100 is associated with a user account of the selected online service is determined. If the determination result is negative, an interface (e.g., the login page of the online service) for associating the electronic device 100 with the user account of the online service is displayed, and than the user may enter the login information such as the user account and the password into the interface to complete the user authorization.

In step S220, a plurality of upload rules corresponding to the selected online service are obtained. In the present embodiment, the upload rules corresponding to the online service comprise a upload frequency, a destination folder, and a privacy setting. The upload rules may be configured by the user according to the usage requirement.

In step S230, a media capture application 135 is initiated on the electronic device 100. For example, while a launch request generated in response to detecting the pressing of a shortcut icon of the media capture application 135, the media capture application 135 is launched, and the media capture device 110 is activated accordingly. After that, the user is able to taking photos and/or recording videos through the media capture application 135.

In step S240, a media file captured by using the media capture application 135 is automatically uploaded to the selected online service in accordance with the upload rules. To be specific, without launching an application corresponding to the selected online service on the electronic device 100, the media file is uploaded and stored into the destination folder residing on a storage device of the online service according to the upload frequency, and who is able to view the uploaded media file is specified in the privacy setting.

In the present embodiment, the upload frequency may be based on the time condition or the network condition. When the upload frequency is a time-based upload frequency, the media file will be uploaded to the online service at a predetermined time point, wherein the predetermined time point comprises a time point immediately after the media file is captured, or a specific time on each day which can be set by the user. On the other hand, when the upload frequency is a network-based upload frequency, the media file will be uploaded to the online service when the electronic device 100 is connected to an available network, such as the WiFi network, the 3GPP network or the LTE network, etc. Alternatively, the media file will be uploaded to the online service only if the network bandwidth reaches a predetermined threshold. Furthermore, the upload frequency may be the combination of the time-based upload frequency and the network-based upload frequency, and the media file will be uploaded while both the time condition and network condition are met.

The destination folder may be a default folder residing on the storage device of the online service, or an existing folder selected by the user. Furthermore, the destination folder may be a new folder created by the user.

In one embodiment, the privacy setting is associated with the destination folder. That is, all files stored in the destination folder have the same privacy setting. In another embodiment, the privacy setting is associated with the media file to be uploaded. Therefore, files stored in the same destination folder may have different privacy settings. The privacy setting is selected from a plurality of predetermined privacy levels defined by the selected online service, wherein the predetermined privacy levels are different from different online services. The privacy setting has to be set in advance, and no change can be made at the point of capturing the media file by using the media capture application 135.

Figure 3:
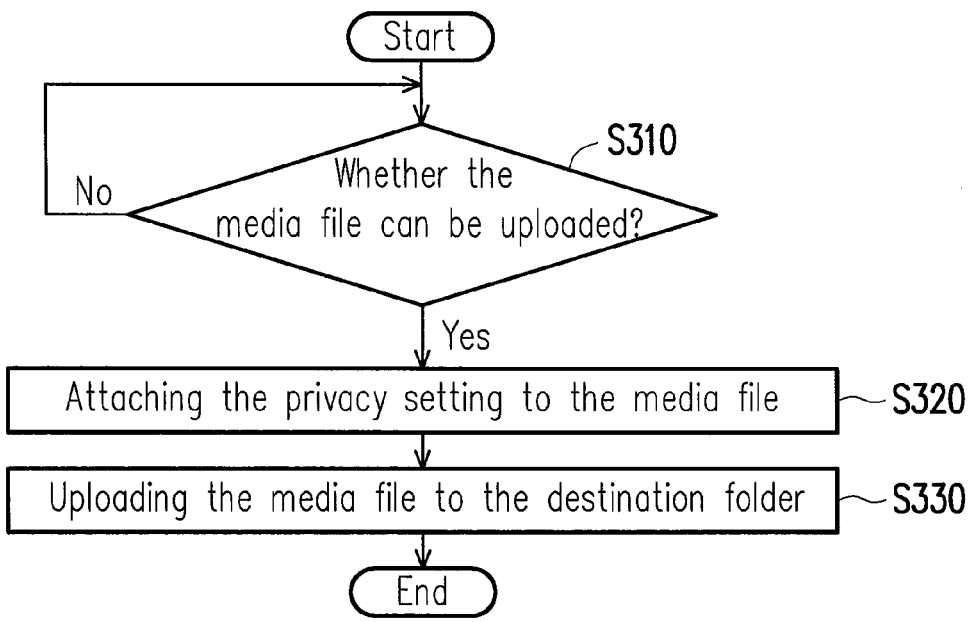
FIG. 3 is a flow chart of automatically uploading a media file in accordance with the upload rules according to an embodiment of the present invention.

FIG. 3 is a flow chart of automatically uploading a media file in accordance with the upload rules according to an embodiment of the present invention. In this embodiment, it is assumed that the privacy setting is associated with the media file to be uploaded.

Referring to FIG. 3, in step S310, it is determined that whether the media file captured by using the media capture application 135 can be uploaded. The determination is based on the upload frequency. If the determination result is negative, the flow of automatically uploading the media file in accordance with the upload rules according to the present embodiment returns to the step S310.

If the determination result is positive, as shown in step S320, the privacy setting is attached to the media file. For example, the media file has to be rearranged according to the transmission protocol, and the information of the privacy setting may be attached into a specific portion (e.g., the header portion) of the rearranged media file. Finally in step S330, the media file is uploaded to the destination folder through the network.

As shown in the foregoing embodiment, after the online service is selected and the corresponding upload rules are determined, the picture taken by the media capture application 135 and the video recorded by the media capture application 135 will be uploaded automatically to the selected online service without launching another application. Alternatively, a confirm button for user confirmation is displayed on the screen of the electronic device 100 before actually uploading the pictures and the videos, and the media file will be uploaded in response to the selection of the confirm button.

Figure 4:
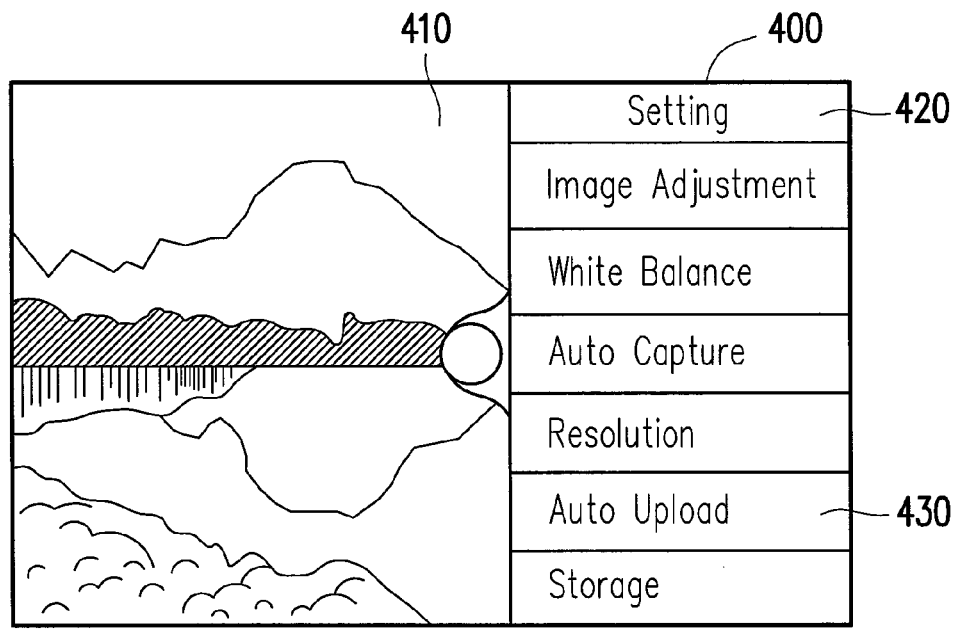
FIG. 4 is a schematic view illustrating an interface provided by the media capture application according to an embodiment of the invention.
Figure 5:
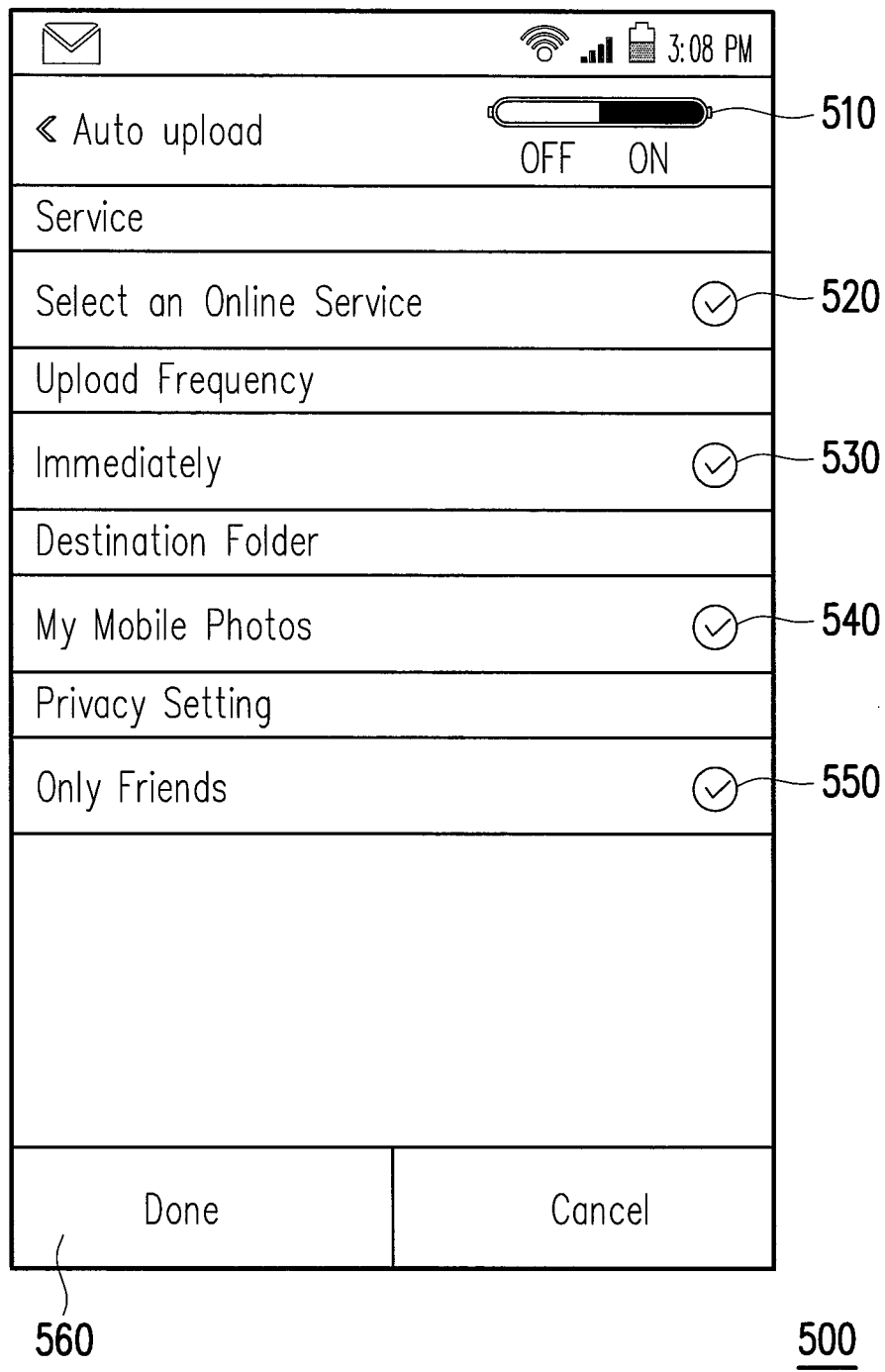
FIG. 5 is a schematic view illustrating an interface for setting the upload rules according to an embodiment of the invention.
Figure 6:
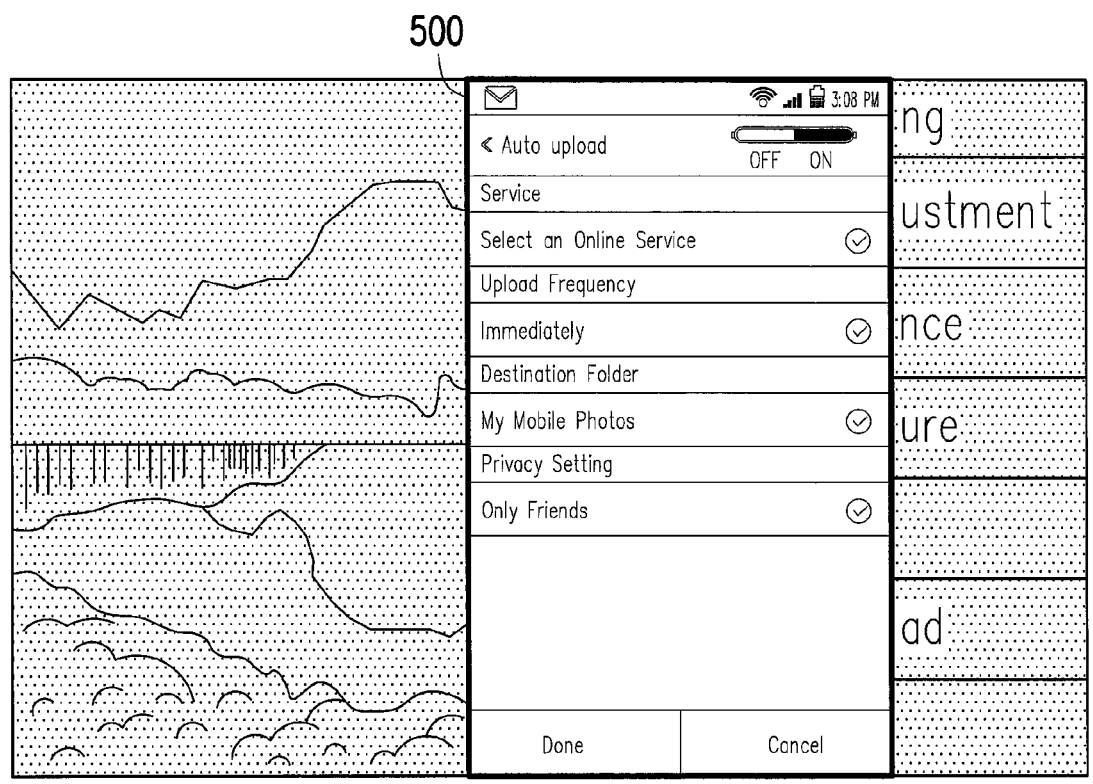
FIG. 6 is a schematic view illustrating an interface for setting the upload rules according to another embodiment of the invention.

FIG. 4 is a schematic view illustrating an interface provided by the media capture application according to an embodiment of the invention. Referring to FIG. 4, the interface 400 includes a live preview area 410 and a setting menu 420. The live preview area 410 is for showing the live preview image or video. While the user selects an option 430 in the setting menu 420, an interface for setting the upload rules as shown in FIG. 5 is displayed. The interface 500 shown in FIG. 5 may be displayed in a pop-up window or a new frame different from the frame for displaying the interface 400. Alternatively, as shown in FIG. 6, after the user selects the option 430 in the setting menu 420, the translucent interface 500 is extended and displayed to cover at least a partial of the frame for displaying the interface 400. The transparency of the translucent interface 500 may be a factory default value, or may be determined by the user. When the toggle 510 is switched on, the electronic device 100 is enable to automatically upload media file to the online service. The user may select an online service by tapping the option 520. Each of the options 530, 540, 550 can be selected for setting the related upload rule. All of the settings will be saved after the user pressing the confirmation option 560.

In another embodiment, if more than one online service is selected by the user, the media file captured by using the media capture application 135 is automatically uploaded to one of the selected online services in accordance with the upload rules and an attribute of the media file. The attribute of the media file may be one or the combination of the size of the media file, the type of the media file, the features extracted from the media file, and an exchangeable image file (EXIF) information embedded in the media file. The media file and its EXIF information (e.g., the audio time, the location, or the photographing parameters) are concurrently shown on a display device (e.g., TV). In addition to the EXIF information, the media capture application 135 may obtain the embedded information for displaying from other file/information provided by standards such as Extensible Metadata Platform (XMP) or International Press Telecommunication Council (IPTC), which is not limited herein.

The invention also provides a non-transitory storage medium storing a computer program, in which the computer program is composed by a plurality of commands. After the commands are loaded into an electronic device and executed, the electronic device can achieve the effects illustrated in the afore-described embodiments. The non-transitory storage medium may be a read only memory, a random access memory, a magnetic tape, a floppy disk, a hard disk, an optical disk, or a transmission medium, which is not to be limited by invention herein.

In view of the above, the present invention provides a method for uploading a media file to an online service, an electronic device using the same, and a non-transitory storage medium, wherein after a specific online service is selected by the user and the corresponding upload rules are determined, the media file captured by the media capture application 135 launched on the electronic device can be automatically uploaded, according to the upload rules, to the selected online service without launching an application related to the online service, thereby improving the convenience of uploading the media file.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for uploading a media file to an online service, comprising:
    obtaining a plurality of upload rules corresponding to an online service;
    initiating a media capture application on an electronic device; and
    automatically uploading a media file captured by using the media capture application to the online service in accordance with the upload rules,
    wherein the upload rules corresponding to the online service comprise one of a time-based upload frequency and a network-based upload frequency, and the step of automatically uploading the media file captured by using the media capture application to the online service in accordance with the upload rules comprises:
        when the upload rules comprise the time-based upload frequency, uploading the media file to the online service at a predetermined time point; and
        when the upload rules comprise the network-based upload frequency, uploading the media file to the online service when the electronic device is connected to a predetermined network.

2. The method of claim 1, wherein before the step of obtaining the upload rules corresponding to the online service, the method further comprising:
    selecting the online service from a plurality of online services accessible by the electronic device;
    determining whether the electronic device is associated with a user account of the online service; and
    displaying an interface for associating the electronic device with the user account of the online service if it is determined that the electronic device is not associated with the user account of the online service.

3. The method of claim 1, wherein the predetermined time point comprises a time point immediately after the media file is captured or a specific time on each day.

4. The method of claim 1, wherein the upload rules corresponding to the online service comprise a destination folder residing on a storage device of the online service, and the destination folder is a default folder residing on the storage device, an existing folder in response to a user selection, or a new folder created by a user.

5. The method of claim 1, wherein the upload rules corresponding to the online service comprise a privacy setting.

6. The method of claim 1, wherein the step of automatically uploading the media file captured by using the media capture application to the online service in accordance with the upload rules comprises:
    uploading the media file to the online service without launching an application corresponding to the online service.

7. The method of claim 1, wherein the media file comprises an image file or a video file.

8. The method of claim 1, wherein the online service comprises an online album, a social networking site, or an online storage.

9. The method of claim 1, wherein the step of automatically uploading the media file captured by using the media capture application to the online service in accordance with the upload rules further comprises:
    automatically uploading the media file to the online service in accordance with the upload rules and an attribute of the media file, wherein the attribute of the media file comprises one or the combination of a size of the media file, a type of the media file, features extracted from the media file, and information embedded in the media file.

10. The method of claim 9, wherein after the step of automatically uploading the media file to the online service in accordance with the upload rules and the attribute of the media file, the method further comprising:
    concurrently displaying the media file and the information embedded in the media file on a display device.

11. An electronic device, comprising:
    a media capture device;
    memory;
    one or more processors; and
    one or more programs, wherein the one or more programs are stored in the memory and configured to be executed by the one or more processors, the one or more programs including instructions:
    to obtain a plurality of upload rules corresponding to an online service;
    to initiate a media capture application to activate the media capture device; and
    to automatically upload a media file captured by using the media capture application to the online service in accordance with the upload rules,
    wherein the upload rules corresponding to the online service comprise one of a time-based upload frequency and a network-based upload frequency,
        when the upload rules comprise the time-based upload frequency, the instructions upload the media file to the online service at a predetermined time point,
        when the upload rules comprise the network-based upload frequency, the instructions upload the media file to the online service when the electronic device is connected to a predetermined network.

12. The electronic device of claim 11, wherein before obtaining the upload rules corresponding to the online service, the one or more programs including instructions to select the online service from a plurality of online services accessible by the electronic device, determine whether the electronic device is associated with a user account of the online service, and display an interface for associating the electronic device with the user account of the online service if it is determined that the electronic device is not associated with the user account of the online service.

13. The electronic device of claim 11, wherein the predetermined time point comprises a time point immediately after the media file is captured or a specific time on each day.

14. The electronic device of claim 11, wherein the upload rules corresponding to the online service comprise a destination folder residing on a storage device of the online service, and the destination folder is a default folder residing on the storage device, an existing folder in response to a user selection, or a new folder created by a user.

15. The electronic device of claim 11, wherein the upload rules corresponding to the online service comprise a privacy setting.

16. The electronic device of claim 11, wherein the instructions upload the media file to the online service without launching an application corresponding to the online service.

17. The electronic device of claim 11, wherein the media file comprises an image file or a video file.

18. The electronic device of claim 11, wherein the online service comprises an online album, a social networking site, or an online storage.

19. The electronic device of claim 11, wherein the one or more programs including instructions to automatically upload the media file to the online service in accordance with the upload rules and an attribute of the media file, wherein the attribute of the media file comprises one or the combination of a size of the media file, a type of the media file, features extracted from the media file, and information embedded in the media file.

20. The electronic device of claim 19, wherein after automatically uploading the media file to the online service in accordance with the upload rules and the attribute of the media file, the one or more programs further including instructions to concurrently display the media file and the information embedded in the media file on a display device.

21. A non-transitory storage medium, storing a computer program for loading into an electronic device, the computer program comprising:
- commands to obtain a plurality of upload rules corresponding to an online service;
- commands to initiate a media capture application on the electronic device; and
- commands to automatically upload a media file captured by using the media capture application to the online service in accordance with the upload rules,
- wherein the upload rules corresponding to the online service comprise one of a time-based upload frequency and a network-based upload frequency,
   - when the upload rules comprise the time-based upload frequency, the instructions upload the media file to the online service at a predetermined time point,
   - when the upload rules comprise the network-based upload frequency, the instructions upload the media file to the online service when the electronic device is connected to a predetermined network.

* * * * *